UNITED STATES PATENT OFFICE.

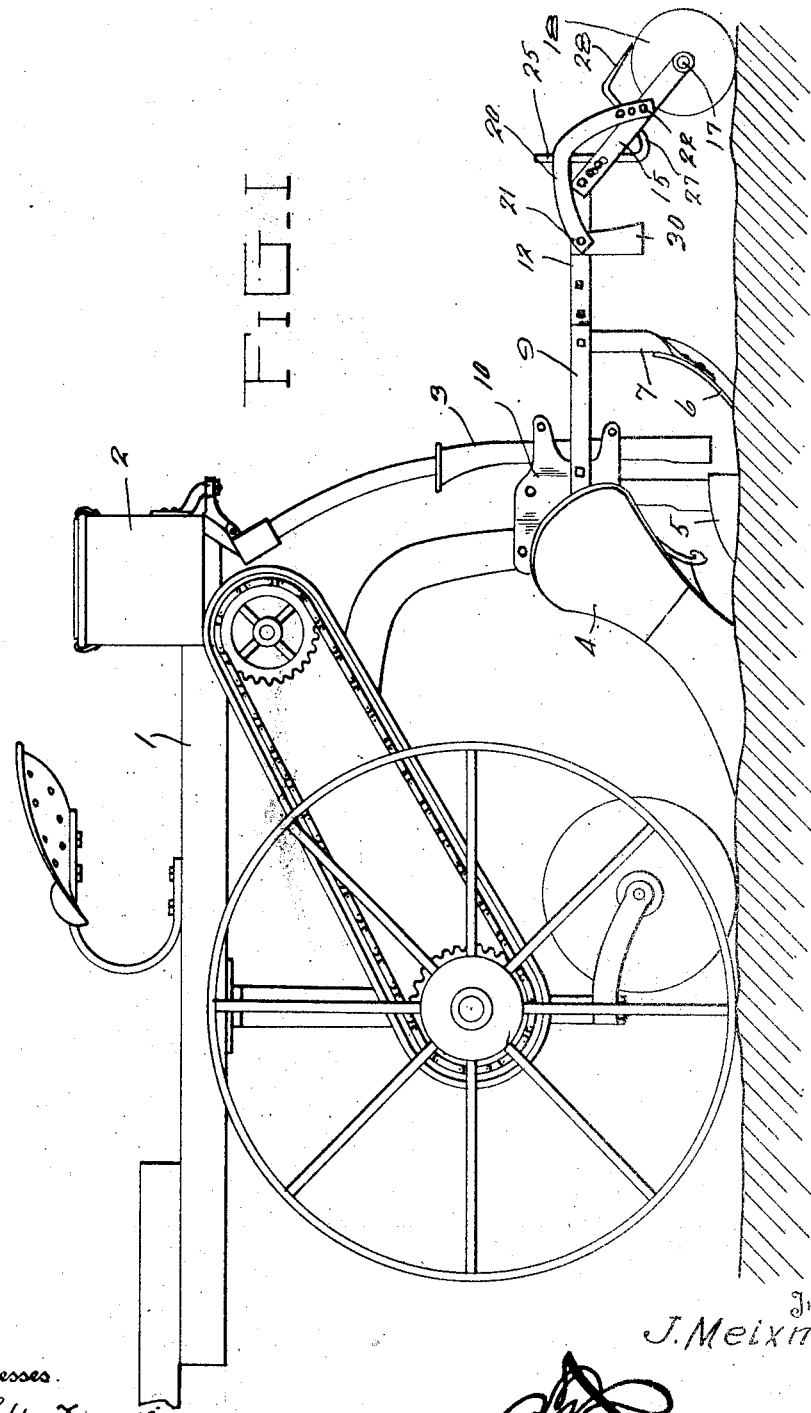

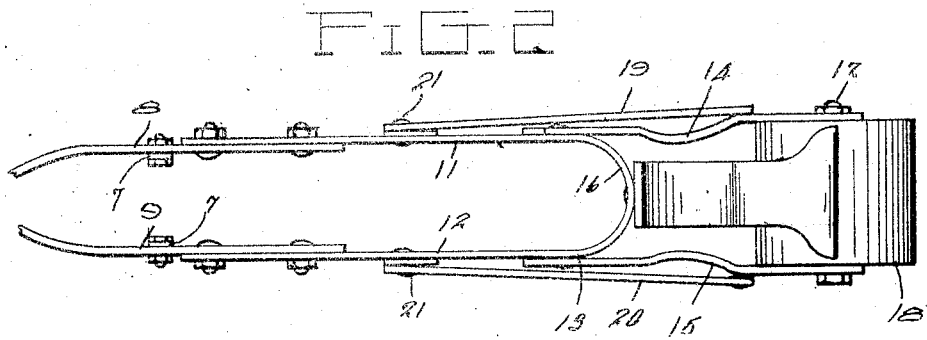
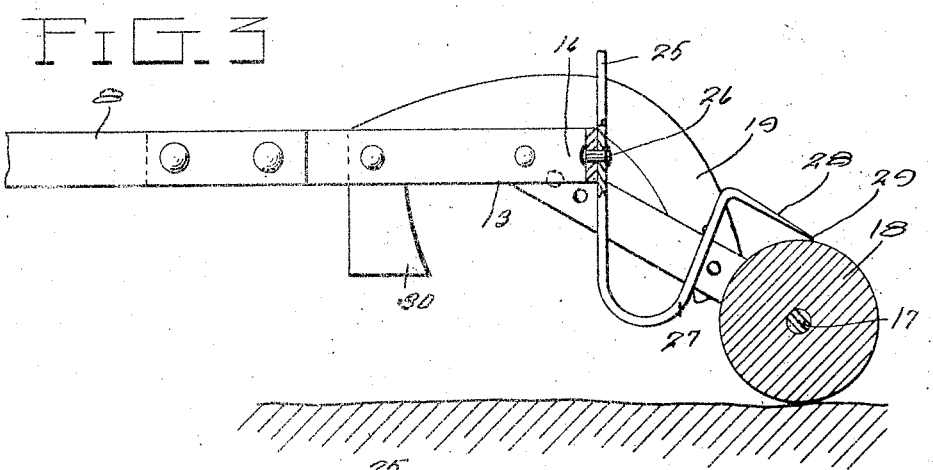
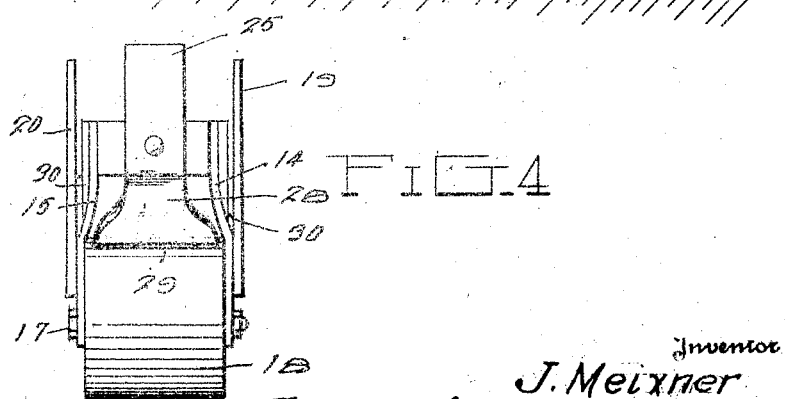

JOHN MEIXNER, OF TRAER, KANSAS.

ROLLER ATTACHMENT FOR LISTERS.

1,209,467. Specification of Letters Patent. Patented Dec. 19, 1916.

Application filed July 30, 1915, Serial No. 42,776. Renewed June 21, 1916. Serial No. 105,084.

*To all whom it may concern:*

Be it known that I, JOHN MEIXNER, a citizen of the United States, residing at Traer, in the county of Decatur and State of Kansas, have invented certain new and useful Improvements in Roller Attachments for Listers; and I do hereby declare the following to be a full, clear, and exact description of the invention, such as will enable others skilled in the art to which it appertains to make and use the same.

This invention relates to an attachment for listers used for planting corn or analogous agricultural products, and the primary object of the invention is to provide a roller, and a novel form of connecting structure for attaching the roller to a lister, rearwardly of the seed dropping spout, the lister share, and the covering shovels, for rolling the ground over the planted grain.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which :—

Figure 1 shows a fragmentary view in side elevation of a lister, showing the improved roller attached thereto, Fig. 2 shows a top plan view of the roller structure, Fig. 3 shows a longitudinal section through the roller structure, and Fig. 4 shows a rear elevation of the roller structure.

Referring more particularly to the drawings, 1 designates a lister of any ordinary construction, as an entirety, which is provided with a seed retaining hopper 2, a dropping spout 3. The dropping spout 3 is positioned directly in the rear of the center of the lister share 4, and the row marker or divider 5. The lister 1 has covering shovels, indicated at 6, positioned rearwardly of the dropping spout 3, which cover the grain, after the same has been deposited in the ground. The shovels 6 are supported by standards 7, which standards are in turn secured to a pair of bars 8 and 9, which are secured to and extend rearwardly from the supporting casting 10, which supports the spout 3 and the marker or divider 5.

The bars 8 and 9 have bars 11 and 12 secured to their outer sides adjacent their rear ends. The bars 11 and 12 form the legs of a substantially U-shaped member 13, which has a pair of bars 14 and 15 connected thereto adjacent the wrist or vertex 16 of the U-shaped bar or member 13. The bars 14 and 15 extend downwardly and rearwardly from the U-shaped member 13, and they have an axle 17 supported by their rear ends. A roller 18, of any desired construction, is rotatably mounted upon the axle 17, and it is positioned rearwardly of and directly in alinement with the spout 3 and the covering shovels 6, for traveling over the row of planted grain.

The bars 14 and 15 are braced by arcuate bars 19 and 20, which bars are secured to the legs 11 and 12 respectively, intermediate of their connection with the bars 8 and 9 and the wrist or vertex 16 of the U-shaped member 13, as is shown at 21. The bars 19 and 20 curve upwardly and downwardly, and are connected to the bars 14 and 15, a short distance above the outer lower ends of the bars, as is shown at 22, forming a substantial and rigid brace for facilitating in supporting the roller 18, and holding the bars 14 and 15 rigidly in their proper positions.

The U-shaped member 13 has a bar 25 secured to the center of the wrist or vertex 16 of the same, as is shown at 26. The bar 25 extends downwardly from the U-shaped member 13, and it is curved upwardly, as is shown at 27, for positioning its upper end 28 above the surface of the roller 18. The end 28 of the bar 26 is angularly positioned to the bar proper, and it has its edge sharpened, as is shown at 29, for forming a scraper for preventing the accumulation of soil upon the surface of the roller.

A pair of depending bars 30 are secured to the legs 11 and 12 at the point of connection between the legs and the bracing bars 19 and 20. The members 30 extend downwardly from the legs 11 and 12, as is clearly shown in Figs. 1 and 3 of the drawings.

From the foregoing description taken in connection with the accompanying drawings the advantages of construction and of the method of operation of the improved roller attachment for listers will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is;—

1. The combination with an ordinary lister embodying a seed dropping spout, a pair of covering shovels positioned rearwardly of said spout, and a pair of bars for supporting said covering shovels, of a substantially U-shaped member having the forward ends of its legs detachably connected to said bars, a pair of bars connected to said legs and extending rearwardly and downwardly therefrom, a roller rotatably carried by the lower downward ends of said last named bars, and arcuate bracing arms connected to said legs of said U-shaped member and said last named bars.

2. The combination with an ordinary lister embodying a seed dropping spout, a pair of covering shovels positioned rearwardly of said spout, and a pair of bars for supporting said covering shovels, of a substantially U-shaped member having the forward ends of its legs detachably connected to said bars, a pair of bars connected to said legs and extending rearwardly and downwardly therefrom, a roller rotatably carried by the lower downward ends of said last named bars, arcuate bracing arms connected to said legs of said U-shaped member and said last named bars, a bar secured to the vertex of said U-shaped member and extending downwardly therefrom, said downwardly extending bar having its end bent angularly with respect to the body portion of the bar and positioned a short distance above the uppermost portion of said roller, for forming a scraper for preventing the accumulation of dirt upon the surface of the roller.

In testimony whereof I affix my signature in presence of two witnesses.

JOHN MEIXNER.

Witnesses:
   J. R. GARDNER,
   L. CARPENTER,